(12) United States Patent
De Ridder

(10) Patent No.: US 10,489,511 B2
(45) Date of Patent: Nov. 26, 2019

(54) CONTENT EDITING USING AI-BASED CONTENT MODELING

(71) Applicant: Edgy Labs, LLC, Houston, TX (US)

(72) Inventor: Alexander De Ridder, Houston, TX (US)

(73) Assignee: INK Content, Inc., Houston, TX (US)

( * ) Notice: Subject to any disclaimer, the term of this patent is extended or adjusted under 35 U.S.C. 154(b) by 0 days.

(21) Appl. No.: 16/255,459

(22) Filed: Jan. 23, 2019

(65) Prior Publication Data
US 2019/0272322 A1    Sep. 5, 2019

Related U.S. Application Data

(60) Provisional application No. 62/636,871, filed on Mar. 1, 2018.

(51) Int. Cl.
*G06F 17/22* (2006.01)
*G06F 17/24* (2006.01)
(Continued)

(52) U.S. Cl.
CPC ...... *G06F 17/2785* (2013.01); *G06F 16/9538* (2019.01); *G06F 17/2247* (2013.01);
(Continued)

(58) Field of Classification Search
CPC ............. G06F 17/2785; G06F 16/9535; G06F 16/24578; G06F 16/3344; G06N 5/04; G06N 20/00
See application file for complete search history.

(56) References Cited

U.S. PATENT DOCUMENTS 8,930,392 B1 * 1/2015 Leichter .............. G06F 16/3322
707/767
9,372,858 B1    6/2016 Vagell et al.
(Continued)

FOREIGN PATENT DOCUMENTS

EP         2375351 B1    10/2011

OTHER PUBLICATIONS

"The Beginner's Guide to SEO" Chapter Four, available Nov. 2017 https://moz.com/beginners-guide-to-seo/basics-of-search-engine-friendly-design-and-development.
(Continued)

*Primary Examiner* — Ariel Mercado
(74) *Attorney, Agent, or Firm* — David H. Judson

(57) ABSTRACT

A method of content production (e.g., content editing) using content modeling to facilitate content production. In one embodiment, an automated process is configured to render content. For a given content portion, and as the given portion is being rendered, the portion is processed to generate a content model. With respect to a concept expressed in or otherwise associated with the content, the system compares the content model with a target content derived model to generate a relevancy score. The target content derived model is generated by (a) identifying a set of target content portions in which the concept is expressed, (b) generating from each content portion an associated target content model; and (c) performing a vector operation on the associated target content models. Preferably, each associated target content model is built using an Artificial Intelligence (AI)-based content analysis. The relevancy score is used to generate a content production recommendation.

24 Claims, 11 Drawing Sheets

(51) Int. Cl.
*G06F 17/27* (2006.01)
*G06F 16/953* (2019.01)
*G06N 5/04* (2006.01)
*G06F 16/9538* (2019.01)
*G06N 20/00* (2019.01)

(52) U.S. Cl.
CPC .......... G06N 5/04 (2013.01); *G06F 17/2235* (2013.01); *G06F 17/273* (2013.01); *G06F 17/274* (2013.01); *G06N 20/00* (2019.01)

(56) References Cited

U.S. PATENT DOCUMENTS

| | | | |
|---|---|---|---|
| 9,449,105 B1* | 9/2016 | Taylor | G06F 16/9535 |
| 2005/0246158 A1 | 11/2005 | Weise | |
| 2010/0235339 A1 | 9/2010 | Anderson et al. | |
| 2011/0252027 A1* | 10/2011 | Chen | G06F 16/335 |
| | | | 707/728 |
| 2012/0131015 A1 | 5/2012 | Badrashiny et al. | |
| 2013/0332440 A1* | 12/2013 | Barad | G06F 16/24578 |
| | | | 707/706 |
| 2015/0154174 A1 | 6/2015 | Hoover et al. | |
| 2015/0309983 A1 | 10/2015 | Hoover et al. | |
| 2015/0379141 A1* | 12/2015 | Stouffer | G06F 16/951 |
| | | | 707/706 |
| 2016/0246772 A1 | 8/2016 | Hoover et al. | |
| 2016/0371248 A1 | 12/2016 | Hoover et al. | |
| 2018/0018553 A1 | 1/2018 | Bach et al. | |
| 2018/0352091 A1* | 12/2018 | Puri | H04M 7/0036 |

OTHER PUBLICATIONS

"Sparse Distributed Representations," Cortical.io, available Nov. 2017 https://www.cortical.io/science-sparse-distributed-representations.html.
"Semantic Search by Cortical.io" Fact Sheet, available Nov. 2017.
"Grammarly FAQ," available Nov. 2017 https://www.grammarly.com/faq#toc1.
PCT/US2019/020199, Initial Search Report and Written Opinion, dated Jun. 2, 2019.

* cited by examiner

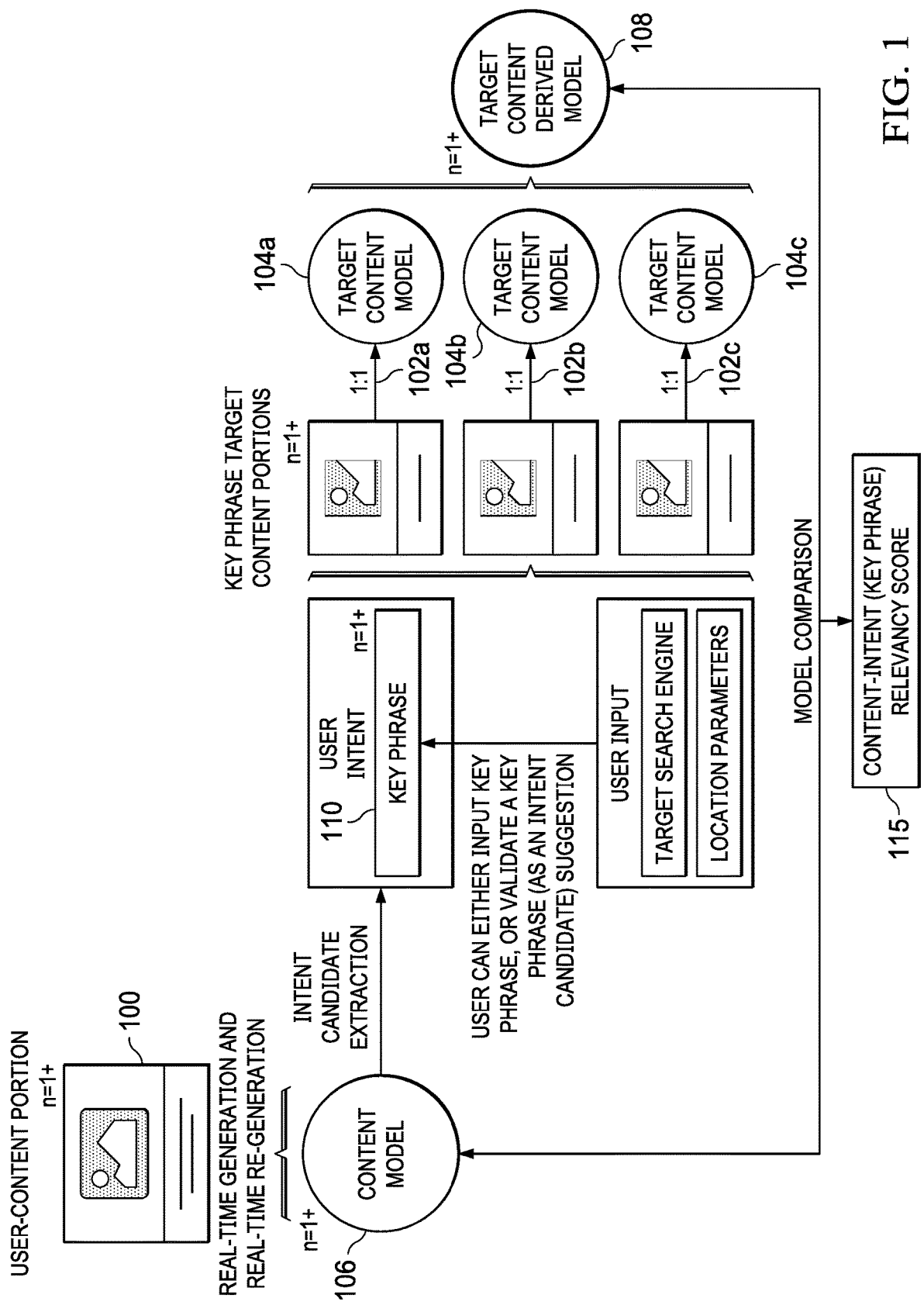

CONTENT EDITING USING AI-BASED CONTENT MODELING

BACKGROUND

Technical Field

This application relates generally to techniques for editing content, such as web-based content.

Brief Description of the Related Art

It is known in the prior art to provide network-accessible (e.g., web-based) editing applications that automatically detect grammar, spelling, punctuation, word choice, and style errors in writing text being composed by a user in an online text editor. One commercial solution of this type works using a browser-based extension that identifies and enables a user to correct writing errors as the user enters text, e.g., on Google® Gmail, Facebook®, Twitter®, etc., in a web page or form. While these techniques and technologies provide advantages, they suffer from various deficiencies that are addressed by the methods and systems of this disclosure.

BRIEF SUMMARY

A method of content production (e.g., content editing) uses Artificial Intelligence (AI)-based content modeling to facilitate content production (e.g., a content editing recommendation) In one embodiment, an automated process (such as a content editor) is configured to receive and render content. For a given portion of the content, and as the given portion of the content is being rendered, the given portion is processed to generate a content model. With respect to a concept that is expressed in or otherwise associated with the content, the system then compares the content model with a target content derived model to generate a content insight relevancy score. The target content derived model is one generated by (a) identifying a set of target content portions in which the concept is expressed, (b) generating from each content portion an associated target content model; and (c) performing a vector operation on one or more of the associated target content models. Preferably, each associated target content model is built using an Artificial Intelligence (AI)-based content analysis. The content insight relevancy score is then used to generate at least one content production recommendation.

In one embodiment, the content editor is rendered in an end user client machine application, and the content insight relevancy score is a semantic relevancy score. The semantic relevancy score typically is a value that indicates a degree to which the concept is conceptually or semantically complete in depth and breadth with the content so as to bias a search engine to include a document that includes the content. In this embodiment, implementing the content production recommendation increases a likelihood that the content so produced receives a higher ranking when one or more keywords associated with that produced content are subsequently evaluated by the search engine.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 4A:
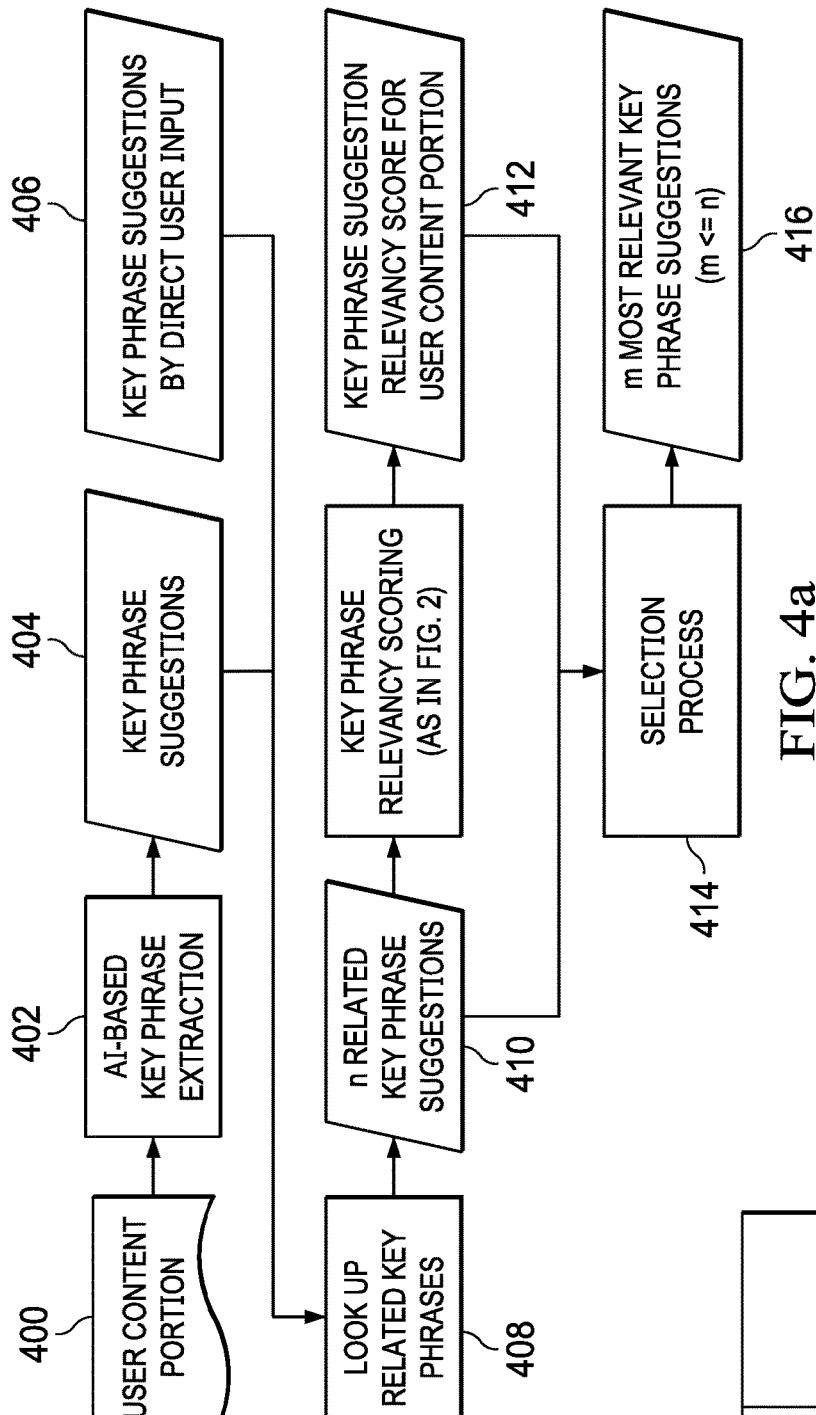
FIG. 4a depicts a process flow identifying relevant key phrase suggestions for user content.
Figure 4B:
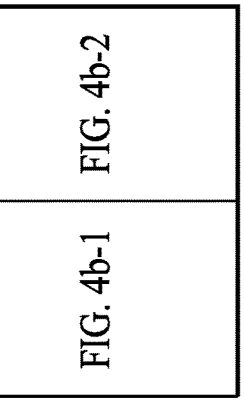
FIG. 4b depicts a process flow for an alternative selection process for key phrase suggestions.
Figures 1, 4B:
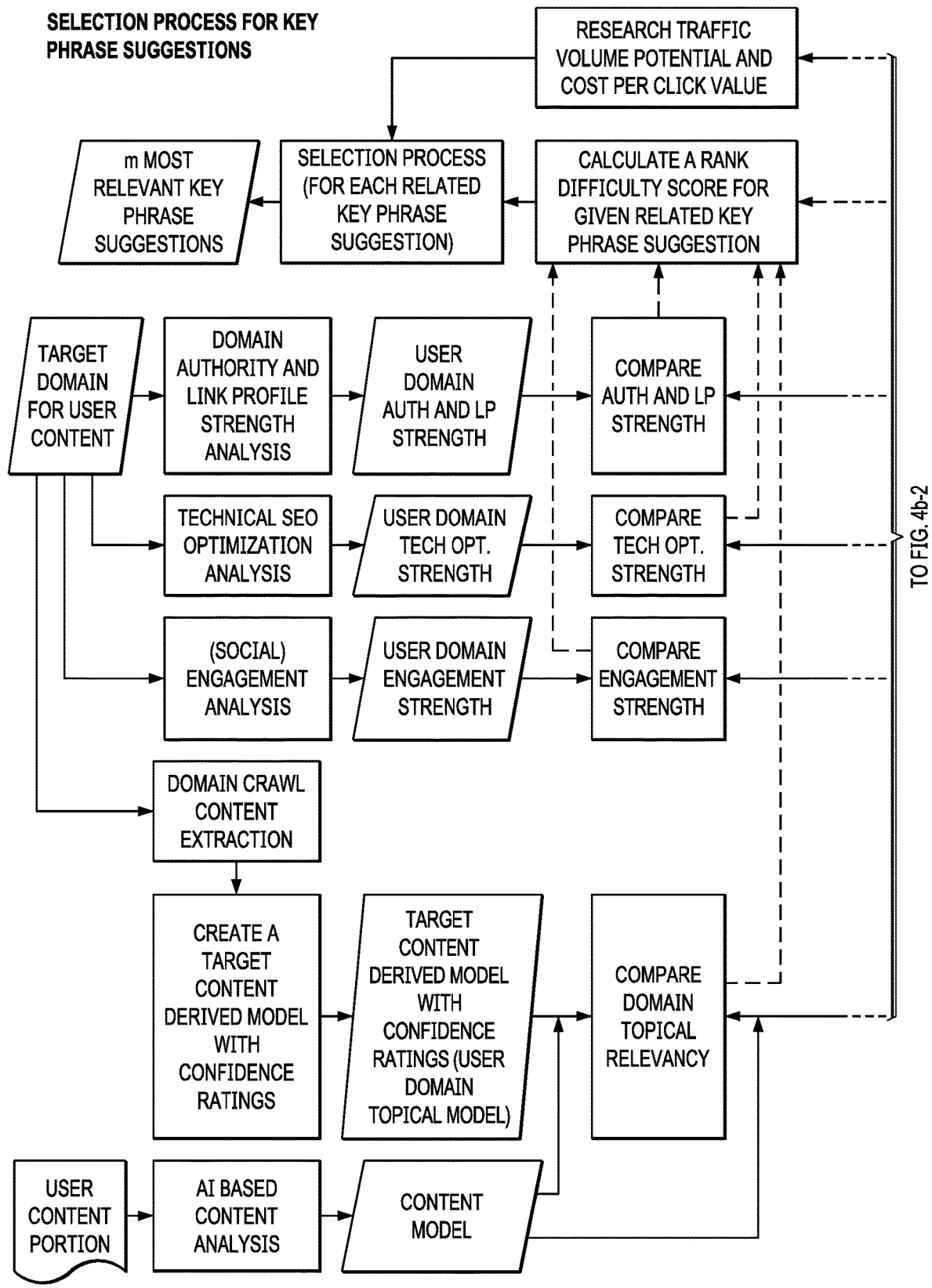
FIG. 1 depicts an embodiment of a content editing technique according to this disclosure.
Figures 2, 4B:
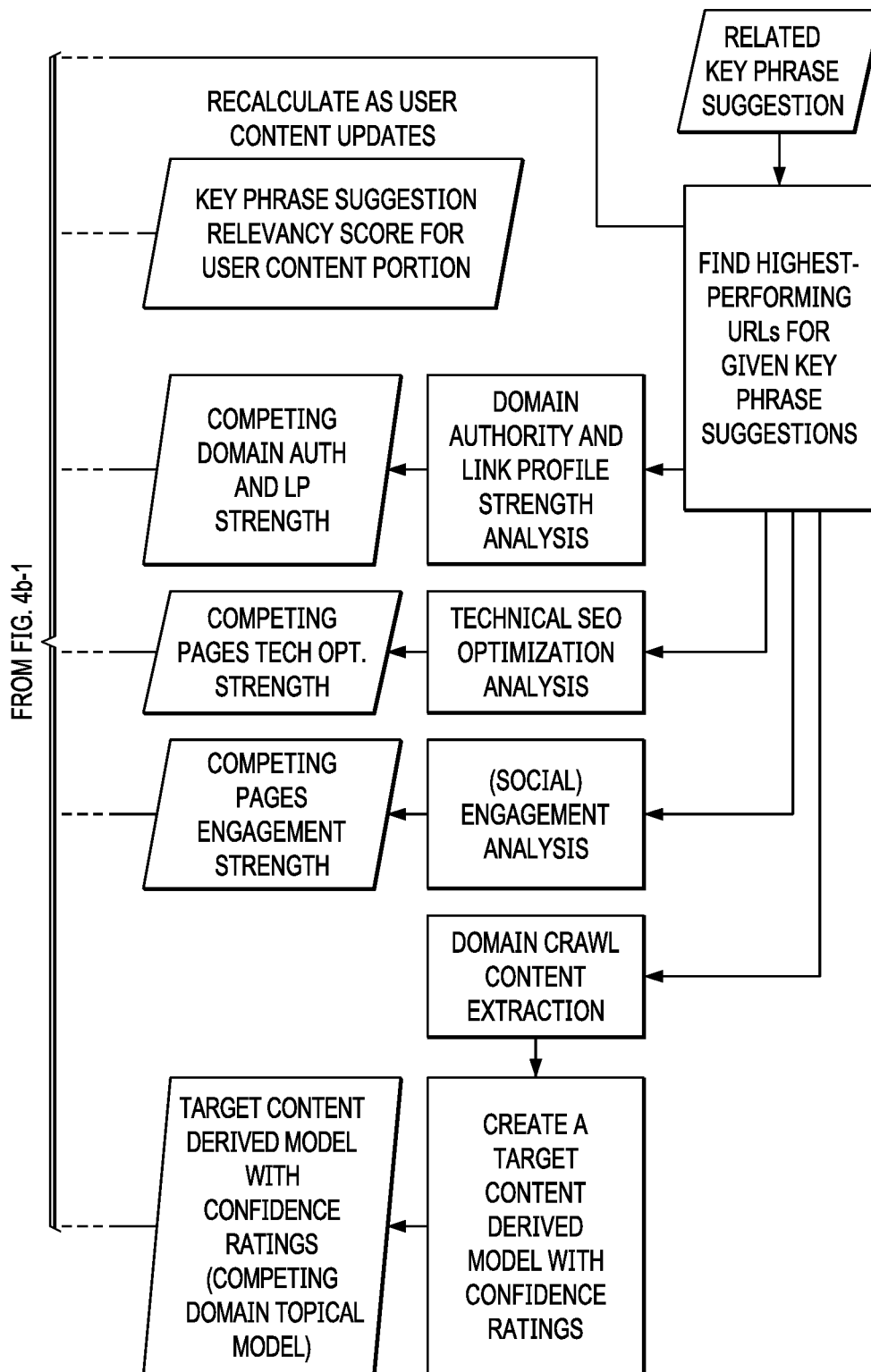

FIG. 1 depicts an embodiment of a content editing technique according to this disclosure. In a typical but non-limiting client-server based implementation, a user is creating and inputting text into an editor, and that editor is executing as a client computer on the user's computing machine (a personal computer, laptop, tablet, other mobile device, Internet-of-Things (IoT) device, etc.). Typically, an editor is implemented as a client application, as a webpage (e.g., having form fields), or the like, and it provides a graphical user interface (GUI) by which a user can enter and edit text, all in a known manner. A back-end of the editing application executes in or in association with a server computing machine infrastructure, e.g., operating in a network-accessible location (e.g., a web server, a cloud infrastructure, or the like). The client computer displays (renders) the editor. As the user composes a document, he or she enters text in the editor and, as will be described below, the user receives feedback on his or her text entry while composing the document. The text entry and editing process preferably occurs in real-time (or near real-time).

A first operation of the technique herein is described by way of example. In this example, the user is creating a document that he or she desires to be "ranked" favorably by a search engine, such as Google. As is well known, search engine optimization (SEO) refers to various techniques that can be implemented to affect the online visibility of a website or a webpage in a search engine's results (typically unpaid results). In general, the earlier or higher-ranked on the search results page and more frequently a website or page appears in the search results list, the more visitors it will receive from the search engine's users. In this example, and with reference to FIG. 1, it is assumed that the user is writing a document 100 that he or she desires to show up as highly-ranked in the search engine results (e.g., a Top 20 Google® search engine ranking). In FIG. 1, the document 100 being edited is associated with the user's client-side machine 101, with the remainder of the elements depicted being associated with a server-side application. Typically, the server-side application executes in a network-accessible services platform (described in more detail below). There is no requirement that the services platform be executed on a single machine, as the platform may comprise one or more machines, programs, processes and the like that are co-located or distributed, and one or more of such programs or processes may be accessed from the platform via one or more application programming interfaces to other machines, data sources and services that are external to the platform.

More generally, the document (or portion thereof) 100 is a "user-content portion" that is being generated by the user in real or near real-time. In this example, and as the user is generating the document, a method of content editing is implemented to provide feedback to the user, with a goal being that the user then edits his or her document (e.g., possibly based at least in part on this feedback) to provide a resulting document that (in this example scenario) may then end up with a higher search engine ranking. As will be described, this search engine ranking improvement is achieved by the system providing one or more editing recommendations that attempt to obtain a semantic breadth and depth that is comparable to third party content previously indexed by a search engine. To this end, as the user composes the document on his or her display screen, preferably one or more content editing recommendations are provided to the user in a non-interruptible manner (i.e., in a manner that does not interrupt the user as he or she is creating/editing the document), and preferably in a contextualized option menu, e.g., a sidebar to a main document editing window. This menu preferably updates in real- or near real-time as the user inputs text and that text is rendered in the editor. In an alternative embodiment, a recommendation is provided at least in part using another communication channel, such as audibly. Without intending to be limiting, a recommendation is provided in the form of one of: a grammar recommendation, a spelling check, a keyword recommendation, and a style recommendation. More generally, the recommendation can be considered "additional information" that is associated with the document during the creation process. Other types of additional information associated with the document may be a "score" that provides the user with a metric (or other indicator) that informs the user about some aspect of the writing (e.g., its readability). The particular nature and form of the recommendation or other information is not limiting and typically will be implementation-specific. In one preferred embodiment, the additional information is a relevancy score (e.g., a number between 0-100) that represents an extent to which the edited text (and, in particular, a key phrase therein) is anticipated to obtain a semantic breadth and depth that is comparable to third party content previously indexed by a search engine.

According to this disclosure, a technique to align the semantic depth and breadth of the document text to third party content (such as that previously indexed by a search engine) leverages a notion of a "content model," which is now described. Referring back to FIG. 1, such third party content is represented in this example by a set of key phrase target content portions 102. Each target content portion 102 is generated (or accessed) by the services platform, and in a representative example the target content portions represent sites (or pages thereof) from a search engine ranking (e.g., the Google Top 20 for a particular keyword search term) that have previously indexed by the search engine. According to this disclosure, each of the target content portions 102 has associated therewith a target content model 104 that represents a semantic fingerprint of the key phrase with respect to a particular piece of third party content. A key phrase may comprise one or more keywords. In a typical use case, the key phrase has been indexed by a search engine, with the search results (typically a set of web pages that include the key phrase) then processed by the platform into the target content model(s) as depicted. In particular, the first (or top) search result for the key phrase corresponds to the content portion 102a, and that content portion 102a is then processed by the platform (natively, or using a third party target content model generator) to generate the target content model 104a that corresponds to the content portion 102a. Similar target content models 104b and 104c are then derived for the second and third content portions 102b and 102c, respectively, and so on for each of a given number of target content portions in the search engine rankings.

Preferably, a target content model 104 as used herein is implemented as a sparse bit-pattern data representation, wherein a data representation of this type encodes language- and usage-information in a relatively long binary vector (which when folded in two dimensions becomes a vector grid or space) that has relatively few "active" bits. More generally, the language and usage information may be considered to be a semantic depth and breadth of the key phrase in question. The active bits in the vector represent a semantic fingerprint, and the data representation thus is a symbolic representation of the key phrase (or, more generally, of given text in the document). Two representations with the same or similar bits activated indicates a degree of semantic similarity with respect to the key phrases that are represented in each of the respective representations. Preferably, sparse bit-pattern data representations are generated in a format in which they are easily manipulated with respect to one another such that numerical computations (vector-based mathematical and Boolean operations, such as addition, subtraction, logical AND, OR, and the like) can be performed on respective representations in a computationally-efficient manner. In one non-limiting implementation, a data representation of this form may be obtained by parsing the input text comprising the key phrase, and numerically encoding a meaning of the text as a semantic fingerprint, wherein a particular bit on the resulting grid contains a portion of the meaning of the text.

According to this disclosure, and again with reference now back to FIG. 1, an editing operation is now described. As depicted, as the user generates the text of the document in the editor on the client-side, one or more content model(s) 106 are generated. A content model 106 also is a data representation for a particular piece of content in the document text. To enable the document to potentially achieve a better search engine ranking, the system operates by determining an extent to which the sparse bit-pattern data representations associated with the user's text favorably compares with the representations 104 for the previously-indexed target content portions 102 for the key phrase in question. In one embodiment, the target content portions are obtained by a scraping operation, but this is not a limitation.

As depicted in FIG. 1, in this embodiment this comparison is performed on a key phrase basis. In particular, preferably the target content model(s) 104 are consolidated into an aggregate target content model 108, which is shown as the target content derived model. In particular, and as depicted, the one or more target content models 104 derived from the search engine results (the ranking of the respective one or more target content portions 102) are combined using a vector operator into the target content derived model. In effect, the derived model 108 represents a type and degree of semantic depth and breadth that any document that hopes to achieve the high search engine ranking for the key phrase "must have" in order to obtain such a ranking. Thus, the target content derived model 108 then is compared to the one or more content model(s) 106 to evaluate the degree of overlap in meaning between the text that the user has entered into the editor (as represented by the content model(s) 106) and how the corresponding key phrase impacts search engine results previously indexed (as instantiated in the derived model 108). The comparison between the content model and the derived model 108 typically is a vector operation (e.g., vector subtraction). The result of this comparison operation is a content-intent relevancy score 115 for the particular key phrase, and this result facilitates a determination by the system whether (and to what extent) the document needs to be changed or the text otherwise adjusted. Thus, based on the comparison (and the relevancy scoring), the system generates one or more content recommendations or additional information that is then output to the end user while he or she is editing the document. Given this real-time or near real-time feedback, the end user then edits the document appropriately. The process may then iterate as additional portions of the document are drafted.

In this example, a document that has been edited according to one or more content recommendations that are generated as a result of these semantic comparisons will then be expected to produce a higher search engine ranking.

There is no requirement that a content model be implemented in a sparse bit-pattern data representation, as there may be other types of vector-based representations (e.g., a Word2Vec model, other language encodings, etc.) that may be used as well. Generalizing, and as used herein the content model is any vector that includes information encoding semantic meaning of the relevant concept that a user has expressed an intent to include in the document.

There is no requirement that the content model comparison be carried out on the client-side or the server-side, as the particular vector operations typically are lightweight (computationally-speaking) and can be performed in either location. As noted above, the comparison operation may be iterated as the document is being drafted by the end user.

The nature and type of vector operations used to generate the target content derived model 108, or those that are used to compare that model with the content model 106, will vary depending on the purpose of the comparison being performed. In general, there will be one or more selection criteria that are used to determine the set of candidates that are used for the derived model. In FIG. 1, which is a non-limiting example, the selection criterion is the identification of a key phrase (or, more generally, a "concept" of interest) that a search engine has ranked highly previously. If, for example, a desired user intent 110 (see FIG. 1) is to show that all of the target content portions 102 include the particular concept at issue, then the vector operation will correspond to a "union" operation, and typically this will generate narrower set of results that end up instantiated in the derived model. On the other hand, if the intent is to identify a concept that is permissible to include, although perhaps not essential, a vector operation such as a logical OR may be used. Another option is to "weight" the concepts and then apply a particular type of weighting function to generate the derived model. Thus, here the notion of comparing vectors should be broadly construed, and the particular vector operations (on the sparse data representations) will depend on what the editor is being designed to optimize. More generally, the notion here is to generate a vector representation of a concept in the document being written, and then compare that representation to a derived model for the concept, typically as that concept has been found in text articles or the like. This comparison is done in real-time or near real-time to facilitate the generation of the one or more content editing recommendations.

As also depicted in FIG. 1, the determination of user intent 110 may be the user's input (in the document) of the key phrase, an attempt to validate the key phrase (as an intent suggestion), or otherwise. As also depicted, the process of selecting the content portions 102 may be based on user-input and user-intent. In the example described, a sample selection assumption is that the search engine is rewarding content-intent matchings with higher rankings in relevant search results. This is not a limitation, as the content modeling semantic profiling and comparison methodology described above (which, in FIG. 1 is used to derive search intent) may also be used for other use cases, which are now described.

A first variant involves "engagement" and, in particular, whether the text in the document being drafted is expected to drive a higher end user engagement (with the topic or concept in question). In this example, a sample selection assumption is that users engage more with target content that receives better user content metrics, such as social shares, bounce rates, time on page, and so forth. In this embodiment, and in lieu of generating a content-intent (key phrase) relevancy score 115, the outcome of the comparison between the content model and the derived content model is a content-engagement relevancy score.

Another variant is "conversion" and, in particular, whether the document is expected to drive a higher conversion rate (e.g., for whatever product or service is being described) and this, in turn, may be assumed to depend on whether a particular concept (e.g., "safety" if the document is about a car seat) is included. In this example, a sample selection assumption is that content that receives paid promotion over a certain period of time (and perhaps with a certain budget), is content that successfully converts, and that generates a positive return on investment (ROI). In this embodiment, the content model comparisons generate a content-conversion optimization relevancy score.

With the above as background, the following section provides a description of various process flows that are implemented in accordance with a preferred embodiment. These process flows typically are implemented as software, namely, as a set of computer programs executed in one or more processing or other computing entities. While the various process flows described below depict distinct steps and objects, it should be appreciated that this visualization is for explanatory purposes and is not intended to be limiting. Various steps may be combined or carried out in different sequences, etc., all without altering the intent.

Figure 2:
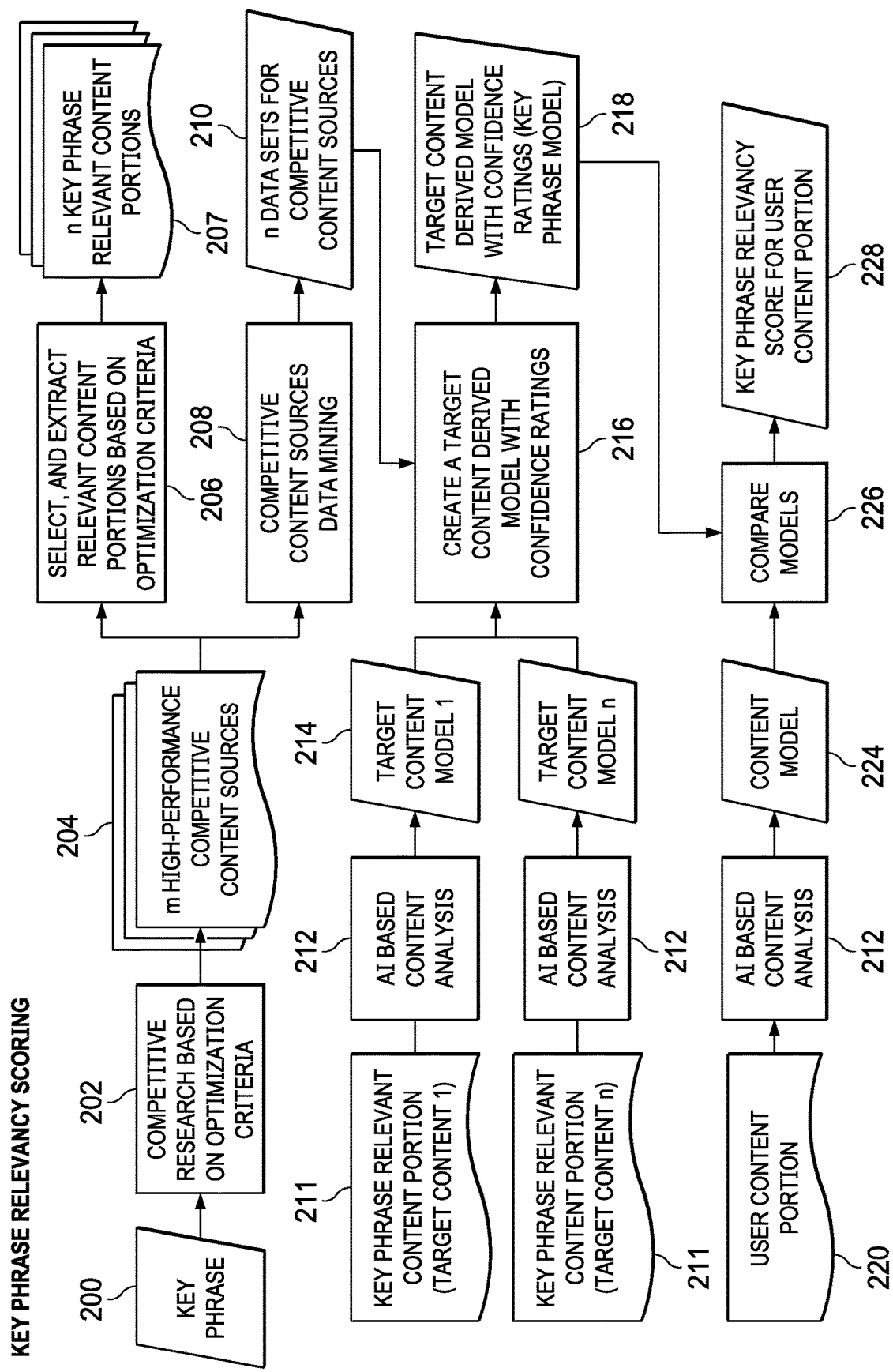
FIG. 2 depicts a process flow for key phrase relevancy scoring according to an embodiment of this disclosure.

FIG. 2 depicts another view of the process flow of an algorithm used to score keywords for relevancy against the content that the user is writing. The flows in FIGS. 1 and 2 thus are similar. In FIG. 2, the process starts with a known key phrase 200 for which the article being composed is to be optimized. Competitive research 202 is then performed with respect to the key phrase, e.g., by examining best ranking articles from Google, most popular products returned from Amazon®, or similar information from other such search engines. The particular source of the competitive research (Google, Amazon, etc.) typically depends on the nature of the content being authored in the editor. During this process, the algorithm may leverage other selection criteria. Irrespective of what research source(s) are used, the system ends up with a set of results (typically URLs) 204 that constitute a number of high-performance competitive content sources. The notion of high-performance means that the sources return high search rankings. These content sources are then used as the foundation for further analysis/research.

In particular, and as depicted, the system then performs additional research to attempt to ascertains why that content ranked well (high). To that end, at 206 the system extracts (from the URLs) those pages that have the content to produce "n" key phrase relevant content portions 208, and associated metadata for each content portion (e.g., how highly a given content portion is ranked, its number of social shares, etc.). Thus, if there are twenty (20) content sources, typically the system outputs the same number of content portions for further analysis. Step 208 represents data mining operations for the competitive content sources that have been identified, and this mining results in "n" data sets 210 for the competitive content sources. For each of the key phrase relevant content portions 211 (e.g. 1 through "n"), the system then performs an Artificial Intelligence (AI)-based content analysis 212 that looks for semantic understanding/meanings in the content portion(s). The output of the AI-based content analysis for a particular content portion is a content model 214, typically in the form of a 2D vector (a pixel grid), which is sometimes referred to herein as a fingerprint. If a semantic meaning is present in the content portion, it is represented in the fingerprint (typically as a pixel); if, however, the meaning is not present in the content portion, it is not represented in the fingerprint. The result is a set of "n" content models, with a content model output for each particular content portion. At step 216, these models are then compared and weighted with respect to one another, typically based on the metadata, e.g., a "1" ranked article gets more traffic than a "20" ranked article, and thus should have a higher weight. This information is then factored in to create a target content derived model (fingerprint) 218, which is preferably an AND-based model representing that a particular concept is present (or most likely present). The target content derived model 218 thus represents all (or substantially all) of the concepts that an article being composed must have, because (as the AI-based analysis has established) all of the highly-ranked articles have these concept(s) in common. Stated another way, if a particular concept is not present in the user's article being composed, the article will lack a concept that the relevant search engine in effect likes to see, e.g., that the search engine must have considered necessary for the article (content source) to have been so highly-ranked in the first instance.

As the bottom portion of the drawing shows, key phrase relevancy scoring is then carried out with respect to a particular user content portion 220 by simply comparing a content model 224 derived therefrom (e.g., using another AI-based content analysis 212) against the AND-based model 218, thereby producing a key phrase relevancy score 228 for the user content portion 220. If the content being composed includes the key phrases, the score will be higher; if one of more phrases are not present, however, then the score will be lower. Based on the key phrase relevancy scoring, the user can then make appropriate adjustments to the content being composed.

Figure 3:
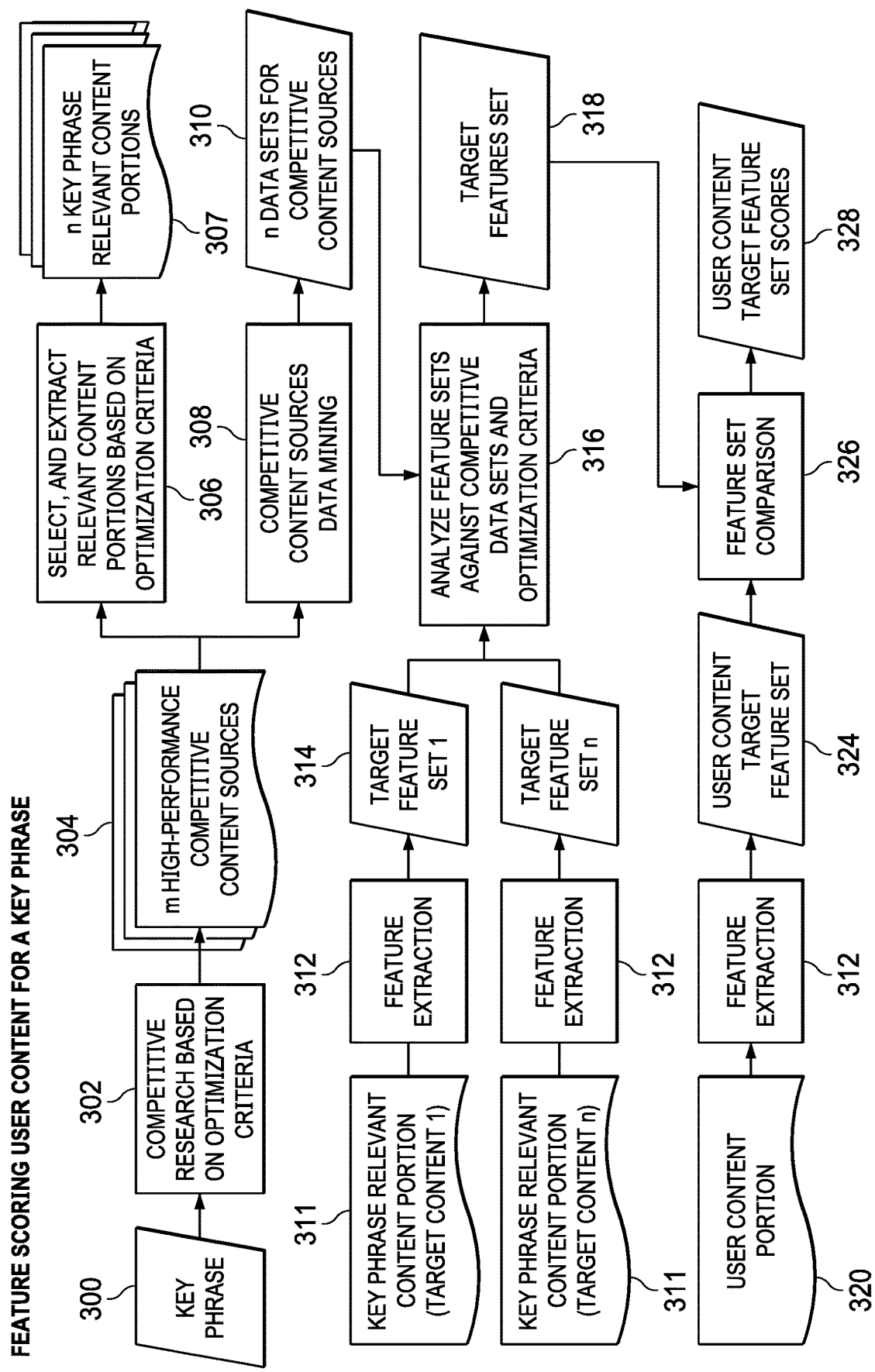
FIG. 3 depicts a process flow for feature scoring user content for a key phrase.

FIG. 3 depicts a process flow for feature scoring user content for a key phrase. As depicted, it should be noted that several of the operations in the drawing correspond to those in the prior figure, namely, reference numerals 300, 302, 304, 306, 307, 308, 310, 311 and 320 (which generally correspond to reference numerals 200, 202, 204, 206, 207, 208, 210, 211 and 220 in FIG. 2). In lieu of the AI-based content analysis, however, in FIG. 3, steps 312 involve feature extraction. The output of this extraction then is a target feature set 314, and the feature sets are analyzed against the competitive data sets and optimization criteria at step 316, with the result being a target features set 318. The features set 318 is then used for feature set comparison 326 to generate user content target feature set scores 328.

Thus, and as depicted, the feature extraction process technique in FIG. 3 preferably begins with a key phrase. Typically, the technique is not used to determine how many words should be used (what is a good word count), what should be the sentiment of the article, what is a reading grade level the article should target, etc. Rather, preferably the algorithm performs feature extraction, comparing features, and making a recommendation based on that comparison.

The process begins with a key phrase and, similar to the processing described above with respect to FIG. 2, the algorithm preferably looks at the search engine top results to identify the high-performing competitive content sources, derives the content portions and their metadata, etc., to obtain the n key-phrase relevant content portions. The 1 through "n" content portions are then analyzed, in this algorithm using feature extraction, to generate a target feature set for each key phrase relevant content portion. As further depicted, the target feature sets are then analyzed with respect to one another, e.g., using an iterative predictive modeling technique, to produce a target features set. One technique for creating the target features set uses a data science-based predictive modeling approach to study how well the system can predict search engine rank based on a scoring of a particular features set. For example, the system takes a particular combination of features and their relative weights (a certain word count, a certain reading level, etc.), and derives an initial prediction (e.g., a score) regarding the feature set; the system then studies how closely the prediction aligns with a real search engine ranking based on the feature set. The result of that analysis is a baseline correlation; the relative weightings are then adjusted and the process is repeated for the feature set, through many iterations. Thereafter, the best scoring feature sets (namely, those that best align with the search engine rankings) are then selected as the target features set. This modeling thus output the best feature set, as well as the data that identifies the impact of each such feature a final search engine ranking.

As shown at the bottom of the drawing, feature scoring of the user content for a key phrase is then carried out with respect to a particular user content portion, typically by simply comparing a user content target feature set derived from content being written in the editor with the target features set derived using the data science-based modeling, with the result being a set of user content target feature set scores. Based on the feature scoring, the user can then make appropriate adjustments to the content being composed.

FIG. 4a depicts a first key phrase suggestion algorithm that depicts how the system uses the user's text (being composed in the editor) to recommend keywords that the user should be using; FIG. 4b depicts a second (variant) algorithm to this end that uses a more complex selection process as compared to the simple approach (relevancy-based) in FIG. 4a. As depicted in FIG. 4a, the user content portion 400 is analyzed (using known AI-based techniques) to perform key phrase extraction 402. One or more key phrase suggestions 404 are then generated. These are words that are actually present in the document being composed. The algorithm also preferably takes as input any key phrase suggestions 406 that are entered by the user by direct user input, e.g., using a sidebar panel on the editor. At step 408, the system then looks up related key phrases, e.g., using the Google keyword input tool, to generate an even larger set of "n" related key phrase suggestions 410. These suggestions thus are considered to be related to the user content portion either by being actually present or possibly present (based on direct user input). For each of the keywords, the system calculates a relevancy model 412 (as described above with respect to FIG. 2), with the results then being compared to the user content portion for relevancy scoring purposes. The most relevant key phrases 416 are then selected (via selection process 414) and returned to the user to complete the process.

The approach in FIG. 4a thus expands the possible keywords, performs a basic relevancy analysis, and returns a selection. The expanded list of possible keywords preferably is updated in real-time as the user is writing, although this is not required.

FIG. 4b depicts an alternative key phrase suggestion algorithm, which has the same goal as the previous algorithm, but it is more complex. This approach takes into consideration the target domain (where the article is expected to be published).

Figure 5A:
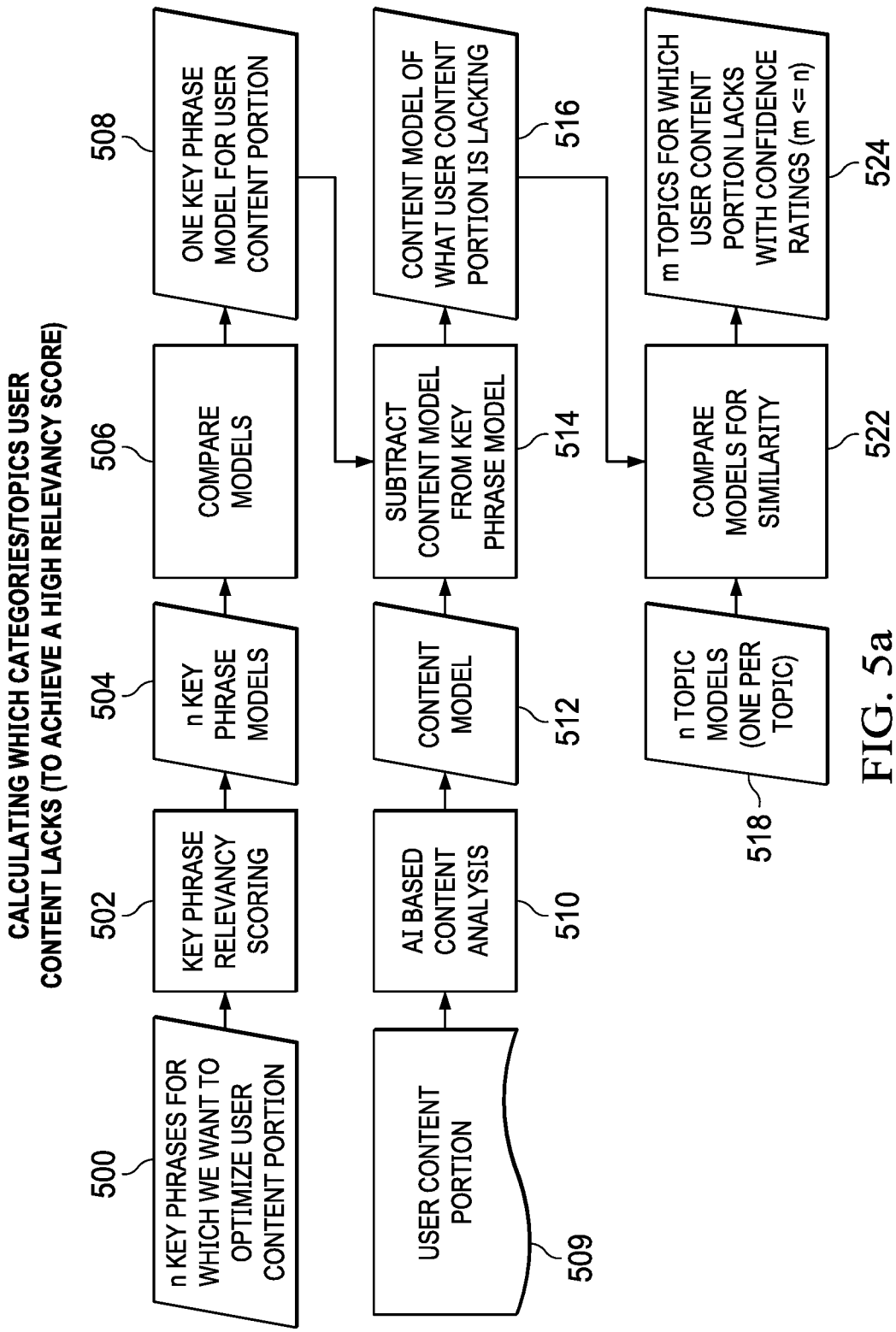
FIG. 5a depicts a process flow for calculating which categories/topics that user content lacks (to achieve a high relevancy score)

FIG. 5a depicts an algorithm for calculating which categories/topics that the user content being drafted is lacking. The output of this algorithm is a set of topics that the user content currently lacks. With this information, the user can then modify his or her content to attempt to achieve a higher relevancy score. To this end, the approach compares a content model derived from the user's content portion to topic-based model (the AND fingerprint representing the must have key phrases) to identify what topic(s) are lacking. The comparison typically is performed by subtracting the content model derived from the user content portion from the key phrase model. The result is a content model of what the user content portion is lacking. That model is then compared for similarity against a set of "n" topic models (typically one per topic) to identify the "m" topics for which the user content portion is current lacking.

Figure 5B:
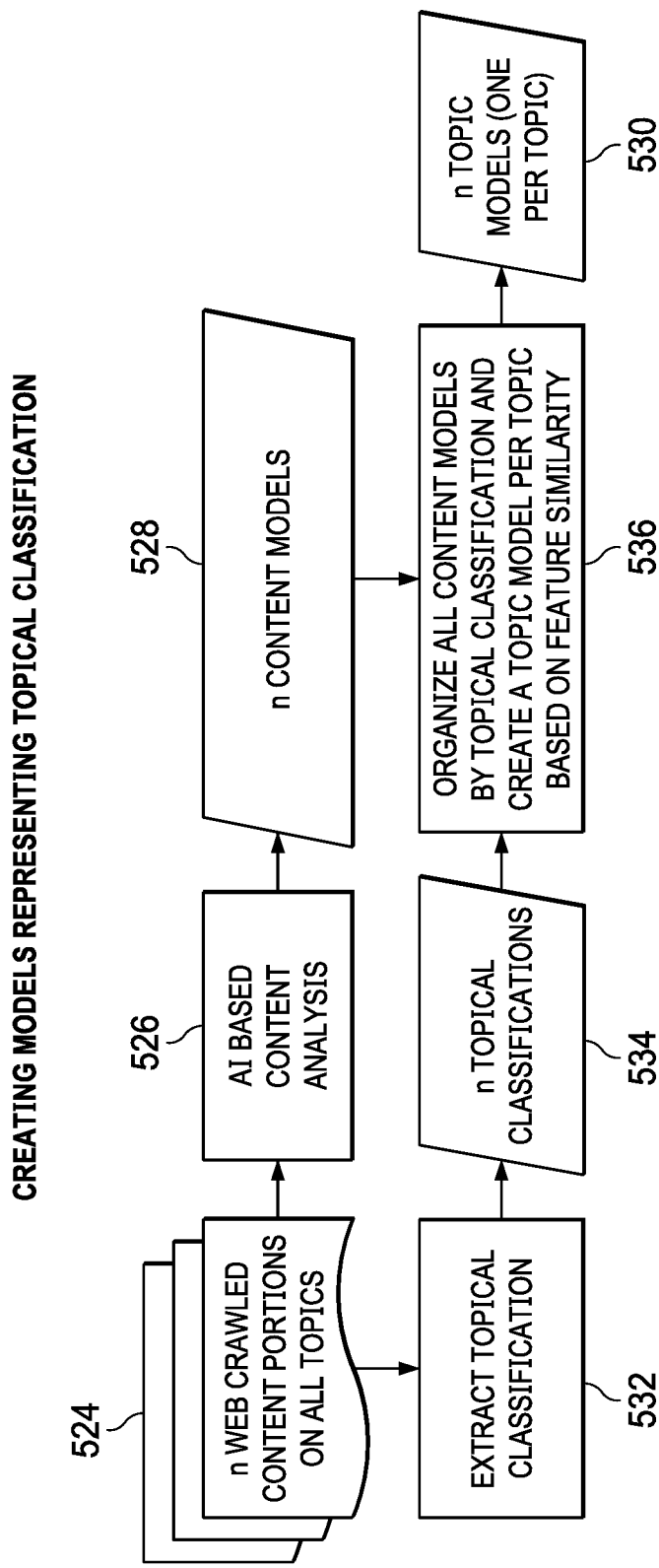
FIG. 5b depicts a process flow for creating models based on topical classifications.

In particular, and as shown in FIG. 5b, "n" key phrases for which it is desired to optimize the user content portion 500 are applied through key phrase relevancy scoring 502 (as in FIG. 2) to generate "n" key phrase models 504. The models are compared 506 to generate preferably one (1) key phrase model 508 for the user content portion. The user content portion 509 is also processed through the AI-based content analysis 510 (as previously described) to generate a content model 512. That content model 512 is subtracted (at 514) from the 1 key phrase model 508 for the user content portion 509 to generate a content model 516 corresponding to what the user content portion is lacking. Content model 516 is then compared with "n" topic models 518 (preferably one per topic). In particular, a similarity comparison 520 outputs "m" topics 522 for which the user content portion lacks. Preferably, one or more conference ratings are attached to the topic outputs 522.

FIG. 5b depicts an algorithm for creating the "n" topic models 524 (used in FIG. 5a) representing topical classifications. To that end, the system crawls a large database of content portions on all topics and extracts topical classification(s). This operation is typically performed during a training stage and need not be repeated. Using an AI-based content analysis 526, "n" content models 528 are created from the content portions. The content models are then organized by topical classification to create a topic model per topic, typically based on features similarity, with the result being the "n" topic models (one per topic) 530. To this end, a topical classification extraction 532 generates "n" topical classifications 534, which at step 536 are then processed based on feature similarity as described.

Figure 6:
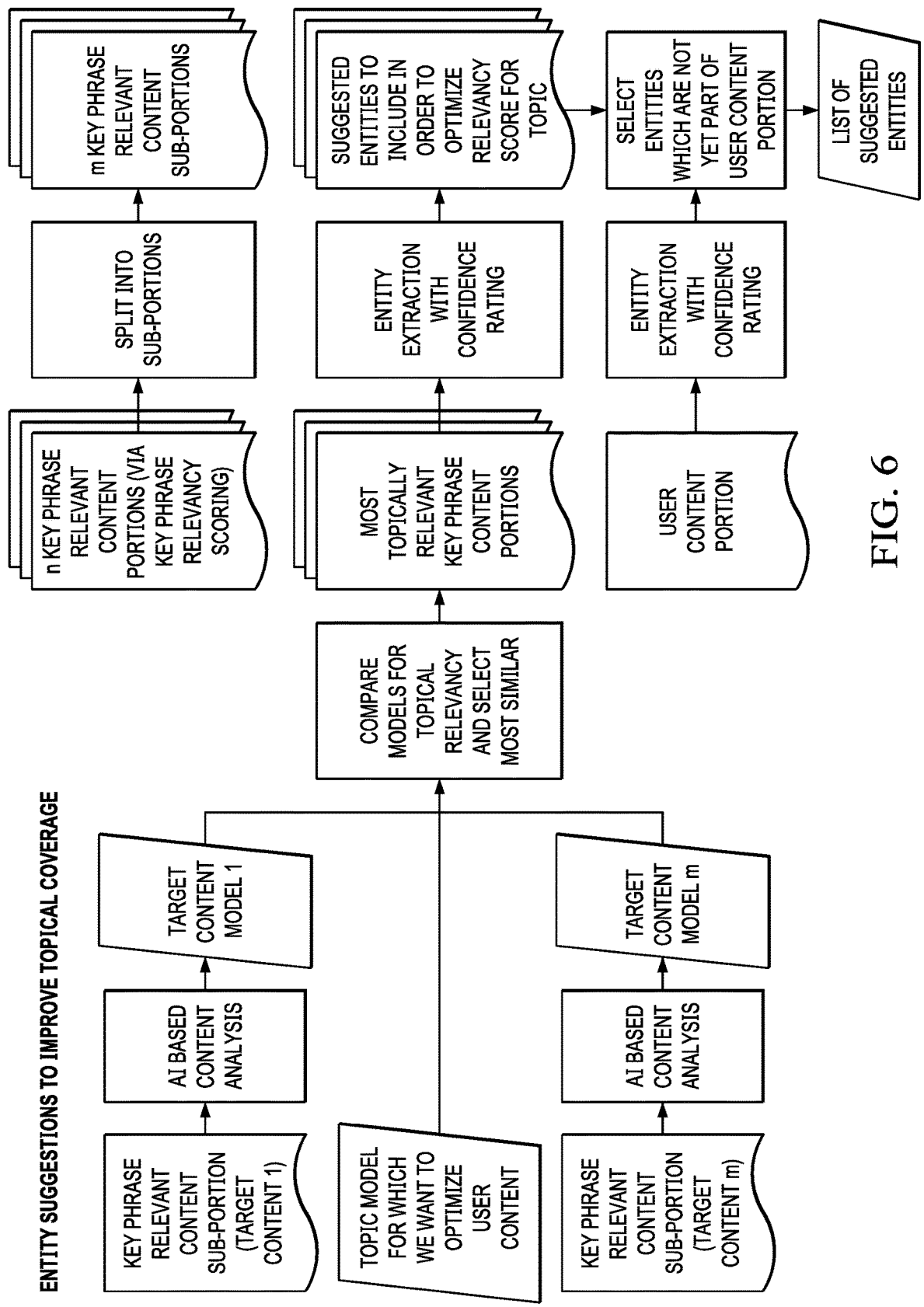
FIG. 6 depicts a process flow to identify entity suggestions to improve topical coverage.

FIG. 6 depicts a process flow for an algorithm that identifies (to the user) "entity" suggestions to improve topical coverage. In particular, this algorithm provides suggestions for how the user—with knowledge about which topics are lacking (from the techniques described above with respect to FIGS. 5a and 5b)—can then modify his or her content to obtain a higher relevancy score. The depicted algorithm typically is executed for every topic that has been identified as lacking. The process starts with the same content identified (scrapped and analyzed) in the key phrase relevancy scoring. That content is split into sub-portions (e.g., paragraphs, although this is not a limitation) to generate "m" key phrase relevant content sub-portions. Each key-phrase sub-portions is then taken through an AI-based content analysis to generate a target content model for that sub-portion. The topic model for which it is desired to optimize the user content is then compared with these models for topical relevancy. The most topically-relevant key phrase content portions are then selected. Entity extraction is then performed, e.g., using known techniques. This creates a candidate list of entities to suggest to the user to include in the article to optimize relevancy score for a topic. Finally, the algorithm compares the list of entities to suggest with those that are determined to already exist in the article, with the difference then being output as the list of suggested entities.

The editor may provide links to provide the user an ability to learn more about an entity. A curation engine may also be used in association with the editor to obtain links (to present to the user) that provide examples of how other authors have written about these entities, and to present to the user an associated sentiment analysis regarding such usage.

Figures 7, 7A:
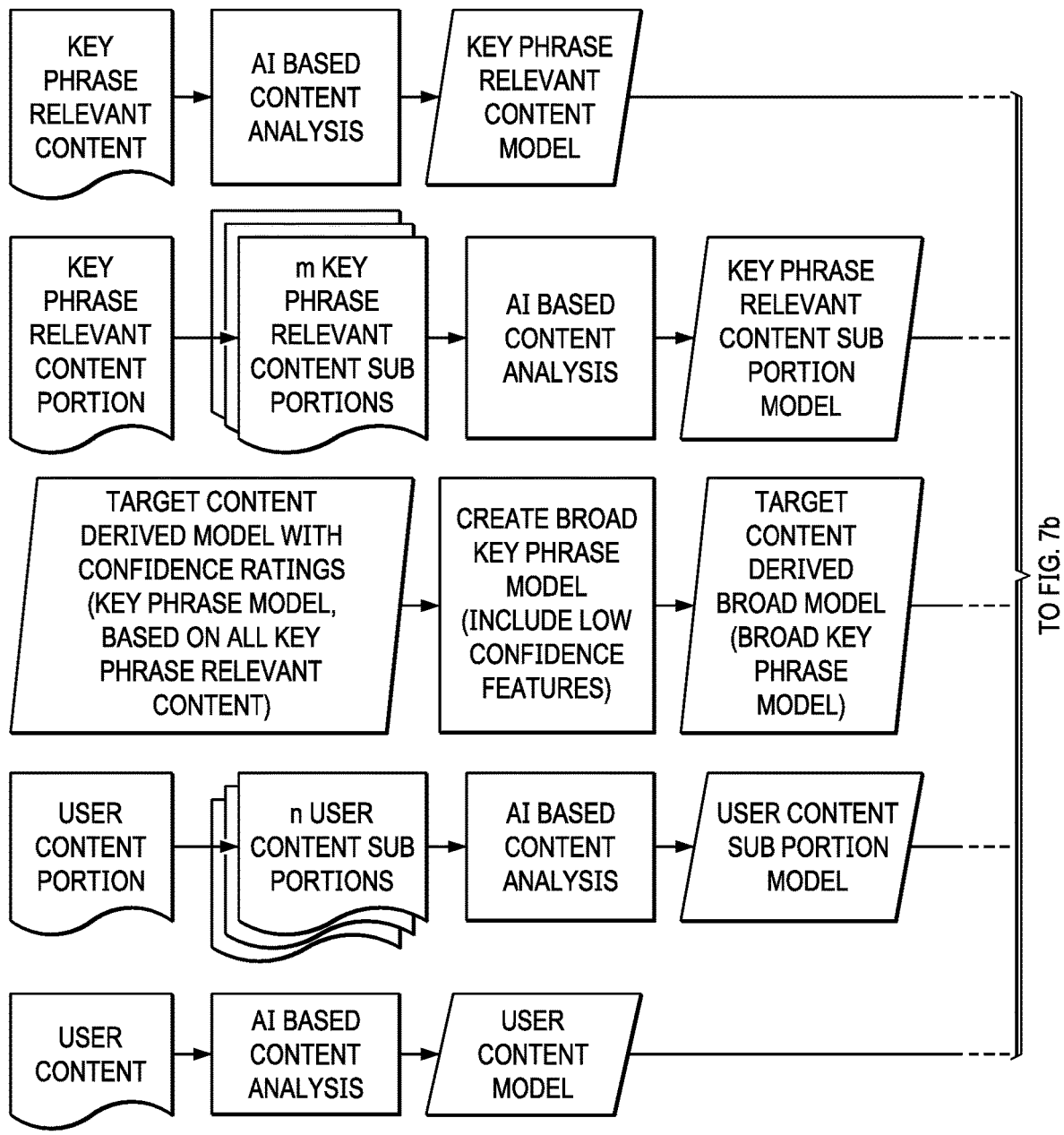
FIGS. 7a and 7b depict a process flow to calculate broad topical coverage of content for a given keyword.
Figure 7B:
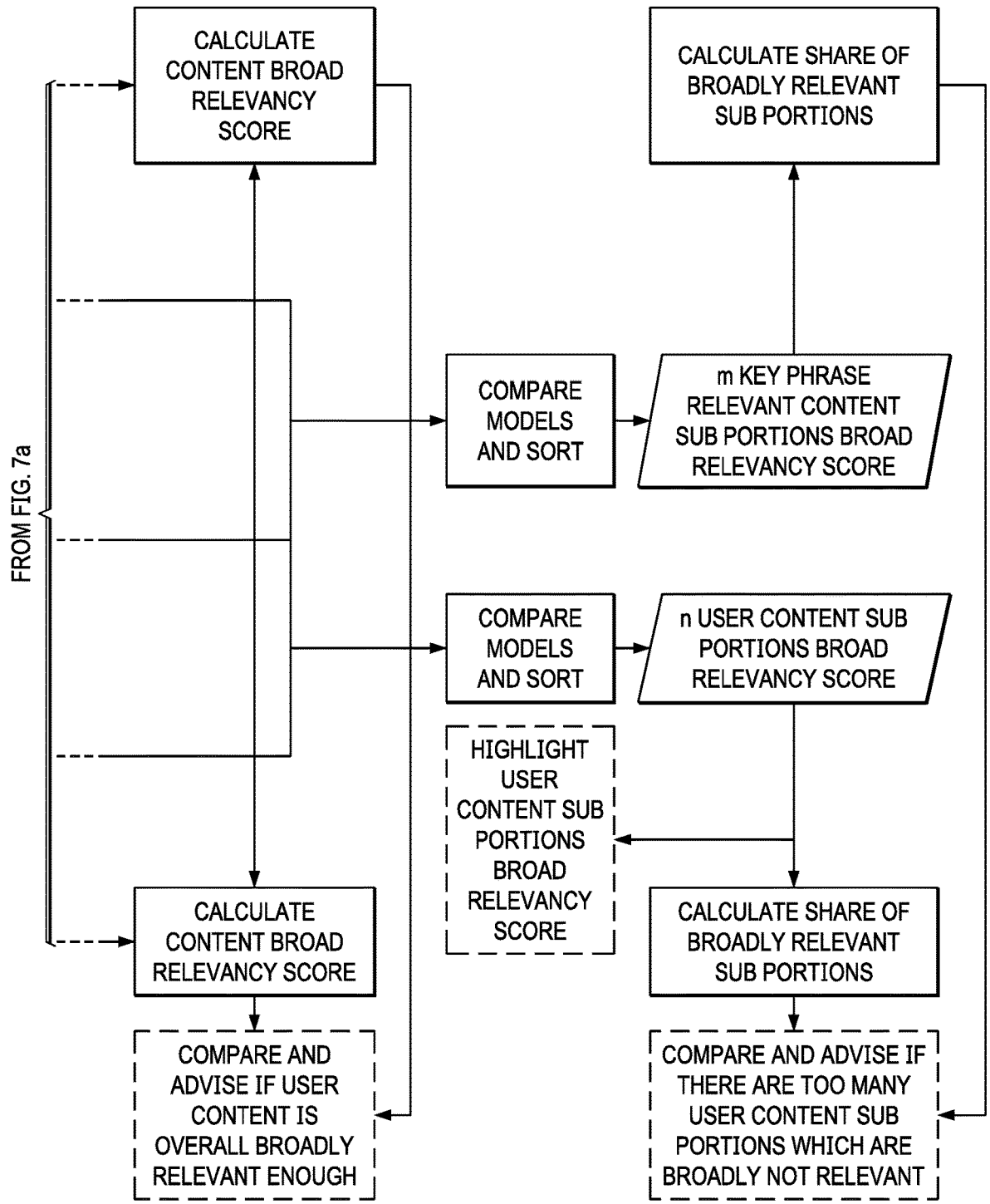

FIGS. 7a and 7b together depict an algorithm for calculating broad topical coverage. This algorithm is designed to augment the algorithm in FIG. 2 (describing the "must have" AND fingerprint), and instead describes a technique to generate a more broad-based fingerprint (an OR fingerprint). The notion here is to try to obtain a broader sphere of concepts that potentially impact relevancy. This fingerprint enables the system to determine whether the content being authored is at least broadly relevant. As depicted, there are three (3) basic aspects: what percentage of the text is broadly relevant, and which is broadly not relevant. Preferably, this analysis is based on sub-portion analysis. The model preferably is very forgiving, namely, to only inform users when they stray or go too far "off-topic." The algorithm compares the user's article with competitive articles (preferably using the OR-based approach that is computed from the broad model), and determines if and how the user's content goes off-topic. The editor then highlights the sub-portion(s) that are deemed most problematic so that appropriate corrections can be made. In an alternative, and in addition to (or in lieu of) looking at sub-portions, the algorithm may be carried out with respect to the article as a whole.

The embodiment depicted in FIGS. 2-7 has focused on semantic relevancy (typically semantic depth and breadth) as the technique used to train the AI, and to score author content, such as key phrases. As previously noted, however, this approach is not a limitation, as other types of content insights besides (or in addition to) semantic relevancy may be leveraged. Thus, and as suggested above, another type of content insight model that may be built and used is based on an emotion-based modeling, such as the notion of emotive conjugations. An emotive or emotional conjugation illustrates one's tendency to describe his or her own behavior more charitably than the behavior of others. A model that is built on emotive conjugation scoring would then identify highly performing content based at least in part, on an author's need or desire to be a member of a particular group. In effect, this type of modeling thus seeks to identify a language of truth for a particular context. Still another type of content insight may be a persuasion-based model that seeks high performing content that has certain characteristics or qualities, such as the ability to drive conversions (conversion optimization).

Thus, according to a more general aspect of the disclosure, the system reads particular content, compares that content to "highly-performing" (according to some metric, attribute and/or characteristic) content associated with one or more content insights (e.g., semantic relevancy, emotional relevancy, persuasion relevancy, etc., and combinations thereof), and provides feedback (recommendations, suggestions, edits, and the like) all in the manner described above.

Further, although one embodiment described herein involves content authoring through an end user-based content editor, the AI-supported techniques herein also have broader applicability. Thus, for example, in another embodiment a website (or other application) accesses the AI system described (e.g., via an API), and the AI is executed against the site's own content (e.g., an article database) to return (output) relevant content insights, e.g., content recommendations. Thus, for example, the system may be used to provide automated content production based on AI-driven content insights. Thus, the techniques herein may be implemented in association with a content management or other publication systems, methods and products.

Thus, and as used herein, a "content editor" may encompass both an end user-based editor (such as a browser-based plug-in), as well as automated content management techniques that generate content recommendations using the AI-supported techniques described above. As a corollary, the notion of rendering a content recommendation may involve outputting recommendation on an editor display, providing outputs from automated processing, and the like.

Enabling Technologies

As noted above, the editor may be implemented in whole or in part as a native application in the client, a browser function, as a browser-based plug-in, a client-side script, in an applet or other executable code, or the like. It may be implemented as an automated program or process.

The server-side processing is implemented in whole or in part by one or more web servers, application servers, database services, and associated databases, data structures, and the like.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Typically, but without limitation, a client device is a mobile device, such as a smartphone, tablet, or wearable computing device. Such a device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The underlying network transport may be any communication medium including, without limitation, cellular, wireless, Wi-Fi, small cell (e.g., femto), and combinations thereof.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

In one embodiment, models are generated in the cloud and processed in the editor, with the data for a particular key phrase or target content portion preferably being stored in a cloud data store. In this manner, computational and processing efficiencies are provided, enabling the editor to be updated and to provide insights in real-time as the end user is authoring content. Over time, and as many users access and use the system, the cloud data store comprises a knowledge base of content models that can then be leveraged for other types of applications and insights. The cloud data store itself can also be used to train a model calculation method that can be embedded inside the editor locally.

AI-based analysis herein typically involves deep learning, e.g., training and using a deep neural network, with results thereof additionally processed by statistical modeling if needed.

What is claimed is as follows:

1. A method of content production, comprising:
   providing an automated content editor process configured to receive and render content;
   for a key phrase within a given portion of the content, and as the given portion of the content is being rendered, processing the given portion to generate a content model;
   with respect to the key phrase, comparing the content model with a target content derived model, the target content derived model having been generated by substeps comprising:
   (a) identifying a set of search engine-indexed third party target content portions in which the key phrase is expressed;
   (b) generating from each search engine-indexed third party content portion a target content model, wherein each target content model is implemented as a semantic representation vector that encodes language and usage information representing a semantic depth and breadth of the key phrase as expressed in the associated third party target content portion, and further wherein at least one target content model is built using an Artificial Intelligence (AI)-based content analysis, wherein the AI-based content analysis looks for semantic understanding/meanings in the content portions to generate the target content models; and
   (c) consolidating into the target content derived model the obtained target content models by performing a vector operation on the semantic representation vectors of the target content models;
   generating a semantic relevancy score based on a comparison of the content model with the target content derived model;
   based on the semantic relevancy score and the comparison, generating at least one content production recommendation; and
   providing the at least one content production recommendation to the content editor process as a content recommendation.

2. The method as described in claim 1, wherein the target content portions are ranked.

3. The method as described in claim 2, wherein the semantic relevancy score indicates a degree to which the key phrase is expressed in or otherwise associated with the content so as to bias a search engine to include a document that includes the content.

4. The method as described in claim 1, wherein the content is one of: text, a hyperlink, an embedding, a markup language page object, meta-data, and combinations thereof.

5. The method as described in claim 1, wherein the content model is generated in a machine that is one of: a machine on which a content editor process is executing, a cloud server, and a server that is accessed from an application programming interface (API) call.

6. The method as described in claim 1, wherein the content model is a static representation of the content.

7. The method as described in claim 6, wherein the static representation is instantiated in a data structure that is one of: a sparsely-distributed bit vector, a matrix, a database, a linked list, an array, and combinations thereof.

8. The method as described in claim 1, further including re-generating the content model to reflect a latest change or addition to the content.

9. The method as described in claim 1, wherein the at least one content production recommendation is a recommendation on how to improve search engine topical relevance.

10. The method as described in claim 1, wherein the at least one content production recommendation is based on the target content portions having one or more traits.

11. The method as described in claim 1, wherein a target content portion comprises content possessing one of: a concept, a meaning, and a feature of interest.

12. The method as described in claim 11, wherein a feature of interest is one of: ranking in one or more search engines for one or more key phrases, possession of one or more metrics in user engagement, virality, source authority, trust and conversion rate.

13. The method as described in claim 1, wherein the semantic relevancy score includes one of: a search intent optimization score, a user engagement optimization score, a conversion optimization score, a content accuracy score, an overall content optimization score, and a recommendation on how to improve a score in association with content and a user input.

14. The method as described in claim 1, wherein comparing the content model with a target content derived model is also based on an emotive conjugation.

15. The method as described in claim 1, wherein implementation of the at least one content production recommendation increases a likelihood that the content so produced receives a higher ranking when one or more keywords associated with that produced content are subsequently evaluated by a search engine.

16. The method as described in claim 1, further including providing at least one content production recommendation to a user in a non-interruptible manner.

17. The method as described in claim 1, wherein the content editor process provides additional information in a contextualized option menu that presents the additional information in a non-interruptible manner.

18. The method as described in claim 17, wherein the contextualized option menu updates as the content is received and rendered.

19. The method as described in claim 17, wherein the additional information is one of: a grammar recommendation, a spelling check, a keyword recommendation, a style recommendation, and a readability score that represents an extent to which the content is anticipated to obtain a semantic depth and breadth comparable to the search engine-indexed third party content.

20. An apparatus, comprising:
one or more hardware processors;
computer memory associated with the one or more hardware processors and that hold computer program instructions, the computer program instructions executed in the one or more hardware processors and configured as program code to:
provide an automated content editor process configured to receive and render content;
for a key phrase within a given portion of the content, and as the given portion of the content is being rendered, process the given portion to generate a content model;
with respect to the key phrase, compare the content model with a target content derived model, the target content derived model having been generated by program code configured to:
(a) identify a set of search engine-indexed third party target content portions in which the key phrase is expressed;
(b) generate from each search engine-indexed third party content portion a target content model, wherein each target content model is implemented as a semantic representation vector that encodes language and usage information representing a semantic depth and breadth of the key phrase as expressed in the associated third party target content portion, and further wherein at least one target content model is built using an Artificial Intelligence (AI)-based content analysis, wherein the AI-based content analysis looks for semantic understanding/meanings in the content portions to generate the target content models; and
(c) consolidate into the target content derived model the obtained target models by performing a vector operation on the semantic representation vectors of the target content models;
generate a semantic relevancy score based on a comparison of the content model with the target content derived model;
based on the semantic relevancy score and the comparison, generate at least one content production recommendation; and
provide the at least one content production recommendation to the content editor process as a content recommendation.

21. The apparatus as described in claim 20, wherein the content model is a heuristic, and wherein the computer program instructions configured to process the given portion execute machine learning.

22. The apparatus as described in claim 20, wherein the automated process is a content editor displayed in one of: a client application, and a website.

23. The apparatus as described in claim 22, wherein the content model is generated in the client machine application, or in a network-based application accessible to the client machine application.

24. A computer program product in a non-transitory computer-readable medium, the computer program product comprising computer program code executable in one or more hardware processors, the program code comprising:
program code configured to provide an automated content editor process configured to receive and render content;
program code configured, for a key, phrase within a given portion of the content, and as the given portion of the content is being rendered, to process the given portion to generate a content model;
program code configured, with respect to the key phrase, to compare the content model with a target content derived model, the target content derived model having been generated by program code configured to:
(a) identify a set of search engine-indexed third party target content portions in which the key phrase is expressed;
(b) generate from each search engine-indexed third party content portion a target content model, wherein each target content model is implemented as a semantic representation vector that encodes language and usage information representing a semantic depth and breadth of the key phrase as expressed in the associated third party target content portion, and further wherein at least one target content model is built using an Artificial Intelligence (AI)-based content analysis, wherein the AI based content analysis looks for semantic understanding/meanings in the content portions to generate the target content models; and (c) consolidate into the target content derived model the obtained target models by performing a vector operation on the semantic representation vectors of the target content models;

program code configured to generate a semantic relevancy score based on a comparison of the content model with the target content derived model;

program code configured to generate at least one content production recommendation based on the semantic relevancy score and the comparison; and program code configured to provide the at least one content production recommendation to the content editor process as a content recommendation.

* * * * *